G. L. HEMBREE.
AGRICULTURAL TOOL.
APPLICATION FILED JUNE 10, 1921.

1,417,901.

Patented May 30, 1922.

INVENTOR

UNITED STATES PATENT OFFICE.

GUY L. HEMBREE, OF BOISE, IDAHO.

AGRICULTURAL TOOL.

1,417,901.   Specification of Letters Patent.   Patented May 30, 1922.

Application filed June 10, 1921. Serial No. 476,381.

*To all whom it may concern:*

Be it known that I, GUY L. HEMBREE, a citizen of the United States, residing at Boise, in the county of Ada and State of Idaho, have invented certain new and useful Improvements in Agricultural Tools, of which the following is a specification.

This invention relates to agricultural tools and has for its object to provide novel means whereby the handle of a pitchfork or the like may be securely connected to the head or working portion of the tool.

Further, the invention aims to provide an agricultural tool which is efficient, reliable in use and cheap to manufacture.

Other objects and advantages of the invention will be apparent during the course of the following description.

In the accompanying drawing forming a part of this application and in which like numerals are employed to designate like parts throughout the same.

Figure 1:
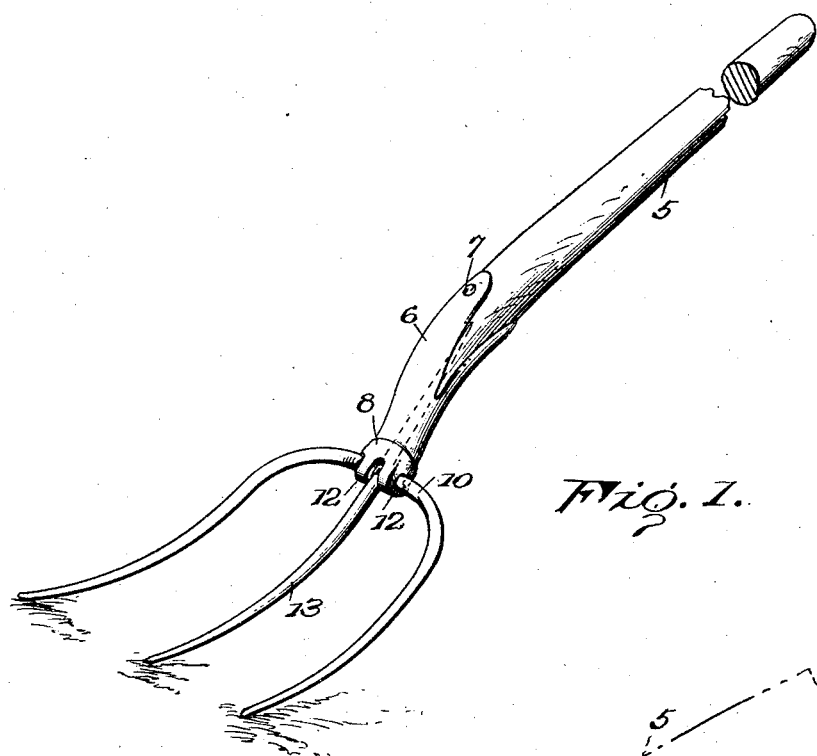
Figure 1 is a perspective of the improved agricultural tool, parts being broken away.
Figure 2:
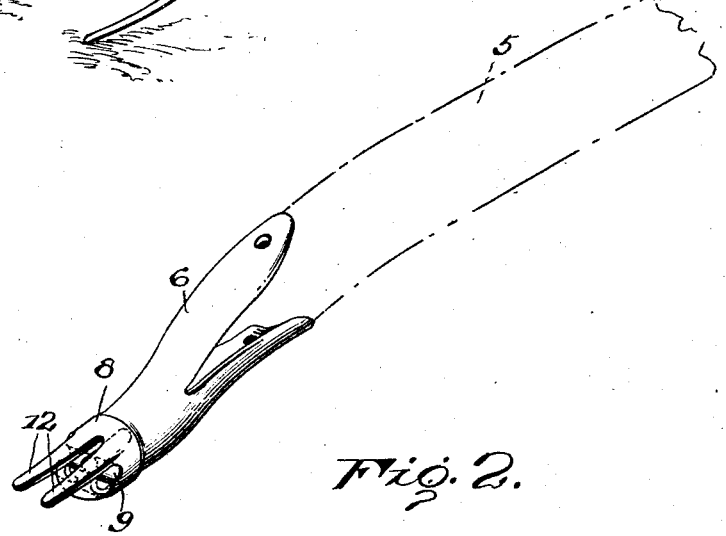
Figure 2 is a perspective of the handle detached.
Figure 3:
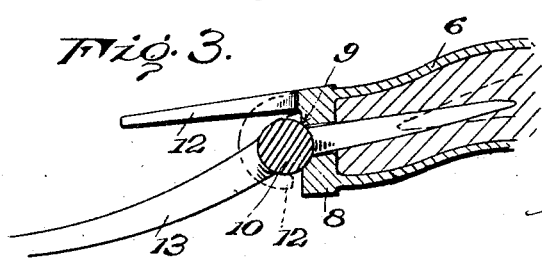
Figure 3 is a detail sectional view through the tool.

In the drawing wherein for the purpose of illustration is shown a preferred embodiment of the invention, the numeral 5 designates a handle having its forward portion somewhat tapered and received within a metallic ferrule 6 connected to the handle by means of fastening devices 7. The ferrule 6 which is tapered toward its forward end terminates in an enlarged head 8 having a transverse groove 9 to receive the intermediate portion of the back 10 of a pitchfork.

As usual the pitchfork is provided with a rearwardly extending attaching shank 11 which is received within an opening in the forward portion of the handle 5. In the use of the fork the shank 11 which is tapered becomes loose in its connection with the handle and in a short time the fork drops from the handle. To overcome this difficulty, I have provided the enlarged head 8 with a pair of spaced fingers 12 adapted to be arranged on opposite sides of the intermediate tine 13 and bent about the cross rod 10 so as to securely connect the fork to the handle. The fingers 12 which are formed integral with the head 8 are gradually tapered toward their free ends and when bent about the adjacent portion of the fork lie flatly in contact with the same so that hay or the like handled by the fork will not become entangled in the fingers.

With reference to the foregoing description it will be apparent that the fork is securely held on the handle by the spaced longitudinally curved fingers 12 and when desired the fork may be removed by merely straightening the fingers.

Having thus described the invention, what is claimed is:—

1. A device of the class described comprising a handle, a ferrule receiving the forward portion of the handle, a head of disk shaped formation connected to the forward end of said ferrule and having a pair of spaced forwardly directed fingers gradually tapered toward their free ends, and a fork having a back piece about which said fingers are snugly bent, said fingers lying closely in contact with said back piece and on opposite sides of the intermediate tine of the fork.

2. A device of the class described comprising a handle, a ferrule receiving the forward portion of said handle, a disk shaped head connected to the forward portion of said ferrule and having a pair of spaced forwardly directed fingers, and a fork having a backpiece about which said fingers are bent, said head being provided with a transverse groove receiving a portion of said back piece, there being an attaching shank carried by said fork and extended into said handle.

3. A tool of the class described comprising a handle, a ferrule connected to the handle, a disk shaped head formed on the forward end of said ferrule and provided with a pair of forwardly directed fingers gradually decreased in thickness toward their free ends, and a fork having a back piece flatly engaged with said head and about which said fingers are extended whereby to securely connect the fork to the ferrule, said fork being provided with an intermediate tine arranged between said fingers, there being a transverse groove in said head to receive a portion of said back piece.

In testimony whereof, I have affixed my signature in the presence of two witnesses.

GUY L. HEMBREE.

Witnesses:
URA E. HAYNES,
LEO N. THOMPSON.